US009088564B1

(12) United States Patent
Hobson et al.

(10) Patent No.: US 9,088,564 B1
(45) Date of Patent: Jul. 21, 2015

(54) TRANSITIONING A LOGGED-IN STATE FROM A NATIVE APPLICATION TO ANY ASSOCIATED WEB RESOURCE

(71) Applicant: INTUIT INC., Mountain View, CA (US)

(72) Inventors: Timothy E. Hobson, Mountain View, CA (US); Shrisha Radhakrishna, Mountain View, CA (US); Kishore Jonnalagedda, Mountain View, CA (US); Soumendra Daas, Bangalore (IN); Bibhakar Ranjan, Bangalore (IN); Douglas L. Foiles, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 221 days.

(21) Appl. No.: 13/762,168

(22) Filed: Feb. 7, 2013

(51) Int. Cl.
*H04L 29/06* (2006.01)
(52) U.S. Cl.
CPC ................. *H04L 63/0815* (2013.01)
(58) Field of Classification Search
CPC ..... H04L 63/0815; H04L 67/02; H04L 63/08; H04L 63/083
USPC .......................................................... 726/1–9
See application file for complete search history.

(56) References Cited

U.S. PATENT DOCUMENTS

| | | | |
|---|---|---|---|
| 5,907,621 A * | 5/1999 | Bachman et al. ............. 713/155 |
| 6,314,425 B1 * | 11/2001 | Serbinis et al. ....................... 1/1 |
| 8,621,065 B1 * | 12/2013 | Saurel et al. .................. 709/224 |
| 8,713,658 B1 * | 4/2014 | Tidd ................................... 726/8 |
| 8,856,907 B1 * | 10/2014 | Tidd ................................... 726/8 |
| 8,881,250 B2 * | 11/2014 | Yefimov et al. .................... 726/7 |
| 2002/0165971 A1 * | 11/2002 | Baron ........................... 709/228 |
| 2008/0301784 A1 * | 12/2008 | Zhu et al. ........................... 726/5 |
| 2012/0054357 A1 * | 3/2012 | Kuritzky et al. .............. 709/229 |
| 2012/0151568 A1 * | 6/2012 | Pieczul et al. ..................... 726/8 |
| 2012/0233705 A1 * | 9/2012 | Boysen et al. ................... 726/29 |
| 2013/0086669 A1 * | 4/2013 | Sondhi et al. ..................... 726/8 |
| 2014/0181944 A1 * | 6/2014 | Ahmed et al. ..................... 726/8 |
| 2014/0189781 A1 * | 7/2014 | Manickam et al. ............... 726/1 |
| 2014/0223527 A1 * | 8/2014 | Bortz et al. ........................ 726/6 |

OTHER PUBLICATIONS

D. Kristol and L. Montulli: "HTTP state management mechanism" RFC 2965, IETF, 2000, 26 pages.*

* cited by examiner

*Primary Examiner* — Catherine Thiaw
(74) *Attorney, Agent, or Firm* — Park, Vaughan, Fleming & Dowler LLP

(57) ABSTRACT

One embodiment of the present invention relates to a system that enables a user of an application that runs natively on a client to obtain access to a web resource that is affiliated with the native application. First, the native application obtains an access token from a Central Authentication Service (CAS). Next, the native application sends a secure request for a one-time use session token to the CAS. If the CAS determines the request is valid, the CAS initializes a session token and sends the session token to the native application. After receiving the session token, the native application directs a browser to an endpoint server, appending the session token to the browser's request. Finally, the endpoint server initializes an authenticated session wherein the authenticated session is scoped to the desired web resource.

21 Claims, 4 Drawing Sheets

TRANSITIONING A LOGGED-IN STATE FROM A NATIVE APPLICATION TO ANY ASSOCIATED WEB RESOURCE

BACKGROUND

Related Art

The present invention generally relates to authentication techniques for native applications and associated web resources.

Applications that execute natively on a computer, otherwise known as "native applications," commonly interact with web properties across the Internet. To gain access to a protected web property, native applications often require a user to "log in" through the native application by typing her password into a dialog box spawned by the native application. However, in situations where the native application needs the user to interact with the web resource directly, the native application may have to spawn an Internet browser instance that is external to the native application and direct the user to access the web resource via that browser. This creates a problem.

While the user has already "logged in" to the native application, the native application has no way of transferring this "logged-in" state to the browser. Thus, when the user navigates to the protected web resource, the browser forces the user to log in again. This additional login is inconvenient for the user and exposes her credentials unnecessarily.

SUMMARY

One embodiment of the present invention relates to a system that enables a user of an application that runs natively on a client to obtain access to a web resource that is affiliated with the native application. First, the native application obtains an access token from a Central Authentication Service (CAS). Next, the native application sends a secure request for a one-time use session token to the CAS. If the CAS determines the request is valid, the CAS initializes a session token and sends the session token to the native application. After receiving the session token, the native application directs a browser to an endpoint server, appending the session token to the browser's request. Finally, the endpoint server initializes an authenticated session wherein the authenticated session is scoped to the desired web resource.

In some embodiments of the present invention, the native application obtains the access token when the user executes the native application for the very first time. Here, the native application prompts the user to provide a username and password to an account with the organization that provided the native application for the user. In many cases, the user may use the username and password to access the other applications or web properties provided by the organization. The native application then sends the username and password to the CAS through a secure transaction. In response, the CAS sends an access token to the native application through a secure transaction. Finally, the native application securely stores the access token.

In some embodiments of the present invention, the session token request is a Hypertext Transfer Protocol (HTTP) request, wherein included parameters comprise the access token, an application token, and one or more context parameters wherein the context parameters specify the web resource to which the native application desires access.

In some embodiments of the present invention, the access token expires after a first time period, while the session token expires after a second time period that is shorter than the first time period.

In some embodiments of the present invention, after the CAS receives a request for a session token from the native application, the CAS validates the access token, the application token, and the context parameters.

In some embodiments of the present invention, initializing the session token comprises the following steps. First, the CAS creates a session token by generating a random ID composed of alphanumeric characters. The CAS then uses the session token as a key to select an entry from a cache. Finally, the CAS stores the session token and the context parameters in the entry.

In some embodiments of the present invention, forwarding the session token to an endpoint server and enabling the endpoint server to initialize an authenticated session that is scoped to the web resource comprises the following steps. First, the native application uses a web browser to pass the session token to the endpoint server. While processing the session token, the endpoint server first determines whether the session token is valid. If so, the endpoint server does the following. First, the endpoint server uses the session token as a key to select an entry from the token cache. Next, the endpoint server generates HTTP session cookies that are scoped to the web resource. The endpoint server then sends the cookies back to the web browser, granting the web browser access to the web resource. Finally, the endpoint server expires the session token.

In some embodiments of the present invention, after the endpoint server sends the HTTP session cookies to the web browser, the endpoint server sends a redirect to the web browser wherein the redirect points to the URL of the web resource. Finally, the web browser follows the redirect to the URL of the web resource.

In some embodiments of the present invention, the endpoint server determines whether the session token is valid with the following steps. First, the endpoint server determines whether the session token, when used as a key to the token cache, points to a valid entry in the token cache. Finally, the endpoint server extracts a stored session token from the entry and determines whether the stored session token matches the session token. If so, the session token is valid.

DETAILED DESCRIPTION

Figure 1:
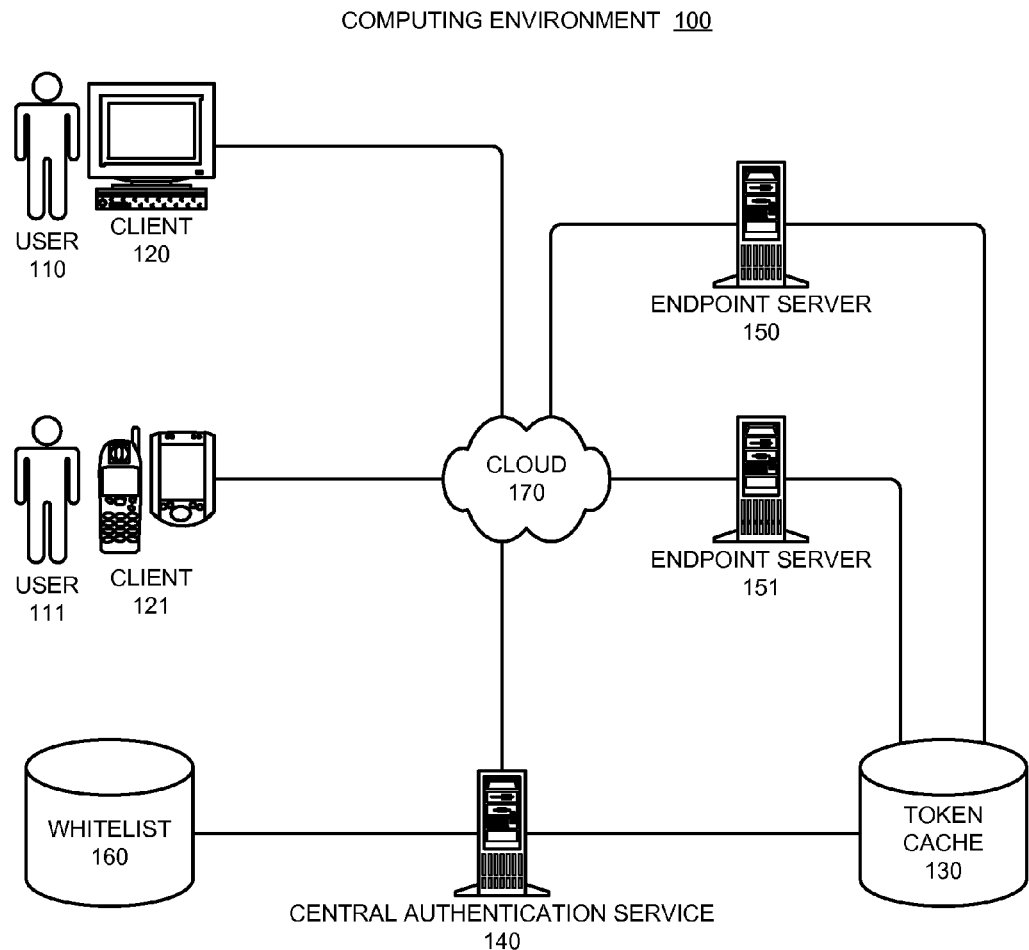
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

By building upon well-known standards for authorizing access to sensitive online data, embodiments of the present invention enable a native application to transfer the application user's "logged-in state" to an external browser. In other words, after providing the native application with a user's credentials, the user of the native application may access protected web properties via an external browser without having to manually log in again. Here, a native application refers to an application that runs natively on a desktop computer, laptop, mobile device, or any other client device. A web resource may include anything as simple as a static webpage or as complex as a full-fledged suite of web applications. Finally, examples of standards for authorization include, but are not limited to, OAuth and OAuth 2.0.

Embodiments of the present invention provide various advantages. Companies that develop and sell native applications to users often encourage users to create a user account that is affiliated with the company. In other cases, a user may sign up for a user account prior to purchasing, from the company, an application through that account. User accounts allow the company to (1) aggregate the user's data at a single conceptual space, (2) provide the user a centralized and remotely accessible site to manage her arrangements with the company, (3) identify users in order to provide online services, and (4) share her data with any native applications and online services provided to her. Most importantly, however, the centralized nature of user accounts allows the company to protect her data via an authorization mechanism such as a login page backed by a Central Authentication Service (CAS). This protection does not come without a price. When a user wants to access a web resource protected by her user account, she must log in with her password. Likewise, when a native application requires access to a similarly protected web resource, the native application must provide the user's credentials. In both cases, the user generally enters her password once. In cases where (1) the user uses the native application, (2) the user has already provided the native application with her credentials, (3) the native application launches an external browser, and (4) the native application directs the browser to a protected web resource, embodiments of the present invention enable the native application to transfer the user's logged-in state to the browser. This prevents the user from having to re-enter her credentials into the browser before gaining access to the web resource. For companies that want to integrate their native application products tightly with their online services, the ability to transfer the logged-in state enhances this feeling of integration and improves the user experience.

In some cases, embodiments of the present invention may make it more difficult to steal a user's credentials. Every time a user manually enters her password, there is a chance that an attack may compromise the credentials, even if the transmission of the credentials is encrypted. Such attacks include intercepting the transmission, using a key logger, or even hijacking the login page. Because embodiments of the present invention reduce the frequency with which the user enters her password, black hats have fewer opportunities to employ these attacks.

In some cases, embodiments of the present invention may provide the optimal balance between security and convenience. First, embodiments of the present invention enable a native application to authenticate with the CAS with a long-term access token in lieu of the user's password. Here, the first time the native application needs to access a protected web resource, the native application asks for the user's password once. The native application then exchanges the password with the CAS for an access token and stores it. Until the access token expires, the native application is free to use the access token to access protected web properties. Because the access token does not expire for a long while (six months, for example), the user rarely needs to provide her password to the native application, enhancing convenience for the user. Note that the long-term access token may be an OAuth access token that is associated with the OAuth standard, an open standard for authorization.

Because access tokens are both unscoped and long-lived, access tokens nearly match the ability of the user's password to access protected content. Thus, the theft of an access token would be almost as damaging as the theft of a user's password. Fortunately, the fact that the company controls the design of the native application minimizes the risks of using the native application to store and transfer access tokens. Because the company does not control the design of an external browser, however, embodiments of the present invention enable native applications to transfer session tokens to external browsers instead of access tokens. Unlike access tokens, session tokens may be short-lived and strictly scoped to a single web resource. Using session tokens, native applications may control, at a fine granularity, the scope of the logged-in state transferred to external browsers, preserving both security and convenience.

One embodiment of the present invention relates to a system that enables a user of an application that runs natively on a client to obtain access to a web resource that is affiliated with the native application, wherein an organization provides both the application and the web resource. First, the native application obtains an access token from a Central Authentication Service (CAS). Note that until the access token expires, the native application may not need to request another access token during subsequent executions. Next, the native application sends a secure request for a session token to the CAS. If the CAS determines the request is valid, the CAS initializes a session token and sends the session token to the native application. After receiving the session token, the native application directs a browser to an endpoint server, appending the session token to the browser's request. Note that the endpoint server may be the same server that hosts the web resource that is affiliated with the native application. Finally, the endpoint server initializes an authenticated session wherein the session is scoped to the desired web resource. Note that accessing the web resource via a web browser requires an authenticated session. A web browser, whose authenticated session is not scoped, may have access to multiple or all web properties provided by the organization. On the other hand, scoping a web browser's session to a specific web resource provides the web browser with access to only that web resource. Scoped sessions may be more secure because, if a black hat hijacks the session, the black hat obtains access to only a single web resource rather than to all web properties provided by the organization.

In some embodiments of the present invention, the native application obtains the access token when the user executes the native application for the very first time. Here, the native application prompts the user to provide the username and password to an account with the organization that provided the native application to the user. Note that the native application may request the username and password as early as install time, or as late as when the native application is about to send the user to a web resource for the first time. In many cases, the user may use the username and password to access the other applications or web properties provided by the organization or a related third party. The following example may illustrate an affiliation between a native application and another application or a web resource. Suppose a user purchases an accounting application from a software development company, and that company may also offer other financial software, including a tax application. To simplify administration of services to customers, this company may require customers to create a company-wide account, wherein the account stores sensitive user-specific data for both the tax and accounting software. Additionally, the username and password pair used to access this account may also be used to access online-only services provided by the company. Examples of online-only services include, but are not limited to user-specific financial data aggregation sites, like Mint.com. The native application then sends the username and password to the CAS through a secure transaction. In response, the CAS sends an access token to the native application through a secure transaction. Note that the Secure Socket Layer (SSL) protocol may secure communications between the native application and the CAS. Finally, the native application securely stores the access token. Note that the application may store the access token in an encrypted data file, or in an internal database.

In some embodiments of the present invention, the session token request is a Hypertext Transfer Protocol (HTTP) request, wherein included parameters comprise the access token, an application token, and one or more context parameters wherein the context parameters specify the web resource to which the native application desires access. Note that the organization may intend the access token to identify the user and intend the application token to identify the application making the request. Also, note that the organization may use a "consumer secret" to "sign" the request before sending it to the CAS. Further, note that context parameters include parameters that explain the context behind the native application's request for access. Context may comprise the time of the request, an identification of the desired web resource, and/or a specific protected uniform resource locator (URL). Finally, the consumer secret may be an OAuth consumer secret that the OAuth standard uses for authenticating "consumers" such as web properties or applications.

In some embodiments of the present invention, the access token expires after a first time period, while the session token expires after a second time period that is shorter than the first time period. For example, the first time period may be six months, while the second time period may be one minute.

In some embodiments of the present invention, after the CAS receives a request for a session token from the native application, the CAS validates the access token, the application token, and the context parameters. Note that when validating the access token, the CAS may check the access token against a data store internal to the CAS or made available in an external service. Also, note that when validating the application token, the CAS may check the application token against an application whitelist wherein a match indicates that the application is valid. Finally, note that the context behind a session token request that the context parameters describe may be invalid if the request is too old, the requested URL is invalid, or the requested web resource is invalid.

In some embodiments of the present invention, initializing the session token comprises the following steps. First, the CAS creates a session token by generating a random ID composed of alphanumeric characters. The CAS then uses the session token as a key to select an entry from a cache. Note that the cache may be a multi-dimensional array, a hash table or a hash map and collisions may be resolved via chaining. Finally, the CAS stores the session token and the context parameters in the entry. Note that if, after storing the session token in the entry, a time equivalent to the second time period elapses, the CAS may automatically clear the entry, which may mark the token as expired.

In some embodiments of the present invention, forwarding the session token to an endpoint server and enabling the server to initialize an authenticated session that is scoped to the web resource comprises the following steps. First, the native application uses a web browser to pass the session token to the endpoint server. To do so, the native application first obtains the URL of the endpoint server internally or from the CAS. The native application then launches an instance of an external web browser and passes the URL, the session token, and other parameters needed for the endpoint server or the web resource to the web browser. The web browser then navigates to the URL and passes along the session token and the other parameters. While processing the session token, the endpoint server first determines whether the session token is valid. If so, the endpoint server does the following. First, the endpoint server uses the session token as a key to select an entry from the token cache. Next, the endpoint server generates HTTP session cookies that are scoped to the web resource wherein the web resource is specified by the context parameters found in the cache entry. For example, if the organization possesses a base domain name "organization.com" and the web resource is located at the following URL "division.organization.com/web_resource/", the endpoint server may generate cookies that grant access to resources only in the subdomain "division.organization.com". This way, if a black hat hijacks the session cookies, the black hat may only breach protected resources found in "division.organization.com" which is a subset of the protected resources under "organization.com." The endpoint server then sends the cookies back to the web browser, granting the web browser access to the web resource. Finally, the endpoint server expires the session token. Note that expiring the session token may be clearing the entry in the cache or setting an expiry flag within the entry.

In some embodiments of the present invention, after the endpoint server sends the HTTP session cookies to the web browser, the endpoint server sends a redirect to the web browser wherein the redirect points to the URL of the web resource. Note that the cookies grant the web browser the ability to access the web resource. Finally, the web browser follows the redirect to the URL of the web resource.

In some embodiments of the present invention, the endpoint server determines whether the session token is valid with the following steps. First, the endpoint server determines whether the session token, when used as a key to the token cache, points to a valid entry in the token cache. Note that if the token cache supports chaining, the endpoint server would determine whether the session token points to a valid bucket in the token cache. Finally, the endpoint server extracts a stored session token from the entry and determines whether the stored session token matches the session token. If so, the session token is valid.

Computing Environment

FIG. 1 illustrates the computing environment 100 of a native application user 110 in accordance with an embodiment of the present invention. Computing environment 100 includes a number of computer systems, which can include any type of computer system based on a microprocessor, a mainframe computer, a digital signal processor, a portable computing device, a personal organizer, a device controller, or a computational engine within an appliance. More specifically, referring to FIG. 1, computing environment 100 includes users 110 and 111, client devices 120 and 121, token cache 130, CAS 140, endpoint servers 150-151, and application whitelist 160.

Client devices 120 and 121 may include any device that includes computational capability such as PDAs, tablet computers, laptops, desktops, smartphones, and cell phones.

Users 110 and 111 may include individuals; groups of individuals; organizations; groups of organizations; computing systems; groups of computing systems or other entities that can interact with computing environment 100.

Token cache 130 may include any type of system for storing data in volatile or non-volatile storage. This includes, but is not limited to, multi-dimensional arrays, hash tables, hash maps, relational database management systems, text files, XML files, spreadsheets. This also includes, but is not limited to, systems based upon magnetic, optical, or magneto-optical storage devices, as well as storage devices based on flash memory and/or battery-backed up memory. Token cache 130 may reside within or outside of CAS 140. CAS 140 and endpoint servers 150 and 151 may access token cache 130 directly or indirectly.

CAS 140 may include any type of service that enables a holder of a credential to access multiple separate properties by providing a single set of credentials once. The hardware infrastructure that hosts this service can comprise a stand-alone server or an advanced computing cluster.

Endpoint servers 150-151 may include any node on a network whose task is to serve content to web browsers running on remote client devices. Endpoint servers can each participate in an advanced computing cluster or can act as a stand-alone server.

Application whitelist 160 may include any type of system for storing data in non-volatile storage. This includes, but is not limited to, relational database management systems, text files, XML files and/or spreadsheets. This also includes, but is not limited to, systems based upon magnetic, optical, or magneto-optical storage devices, as well as storage devices based on flash memory and/or battery-backed up memory. Application whitelist 160 may reside within or outside of CAS 140. CAS 140 may access application whitelist 160 directly or indirectly.

Note that different embodiments of the present invention may use different system configurations, and are not limited to the system configuration illustrated in computing environment 100.

System

Figure 2:
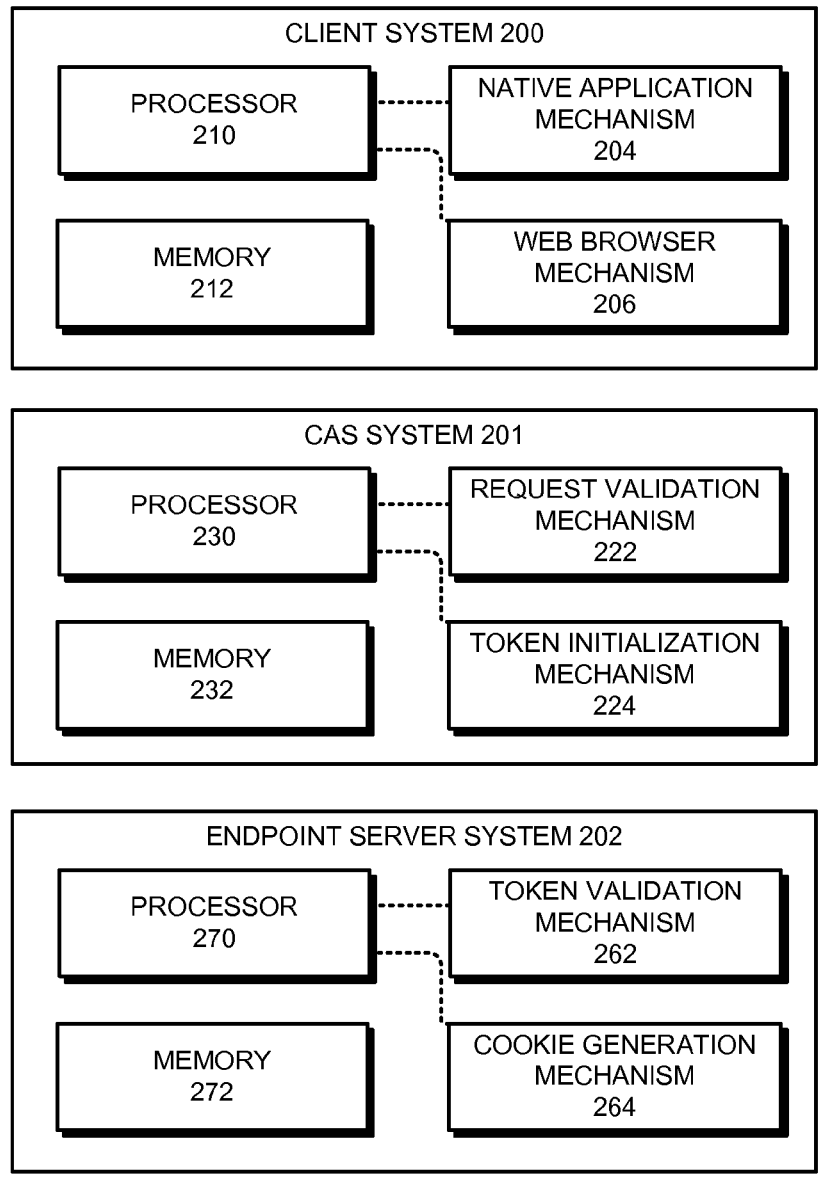
FIG. 2 illustrates a system in accordance with an embodiment of the present invention.

FIG. 2 illustrates a client system 200 in accordance with an embodiment of the present invention. As illustrated in FIG. 1, client system 200 can comprise client device 120. Client system 200 can also include native application mechanism 204, web browser mechanism 206, processor 210, and memory 212.

FIG. 2 also illustrates a CAS system 201 in accordance with an embodiment of the present invention. As illustrated in FIG. 1, CAS system 201 can comprise CAS 140. CAS system 201 can also include request validation mechanism 222, token initialization mechanism 224, processor 230, and memory 232.

FIG. 2 also illustrates an endpoint server system 202 in accordance with an embodiment of the present invention. As illustrated in FIG. 1, endpoint server system 202 can comprise endpoint server 150. Endpoint server system 202 can also include token validation mechanism 262, cookie generation mechanism 264, processor 270, and memory 272.

Transitioning Logged-in State from Native Application to Web Resource

Figure 3:
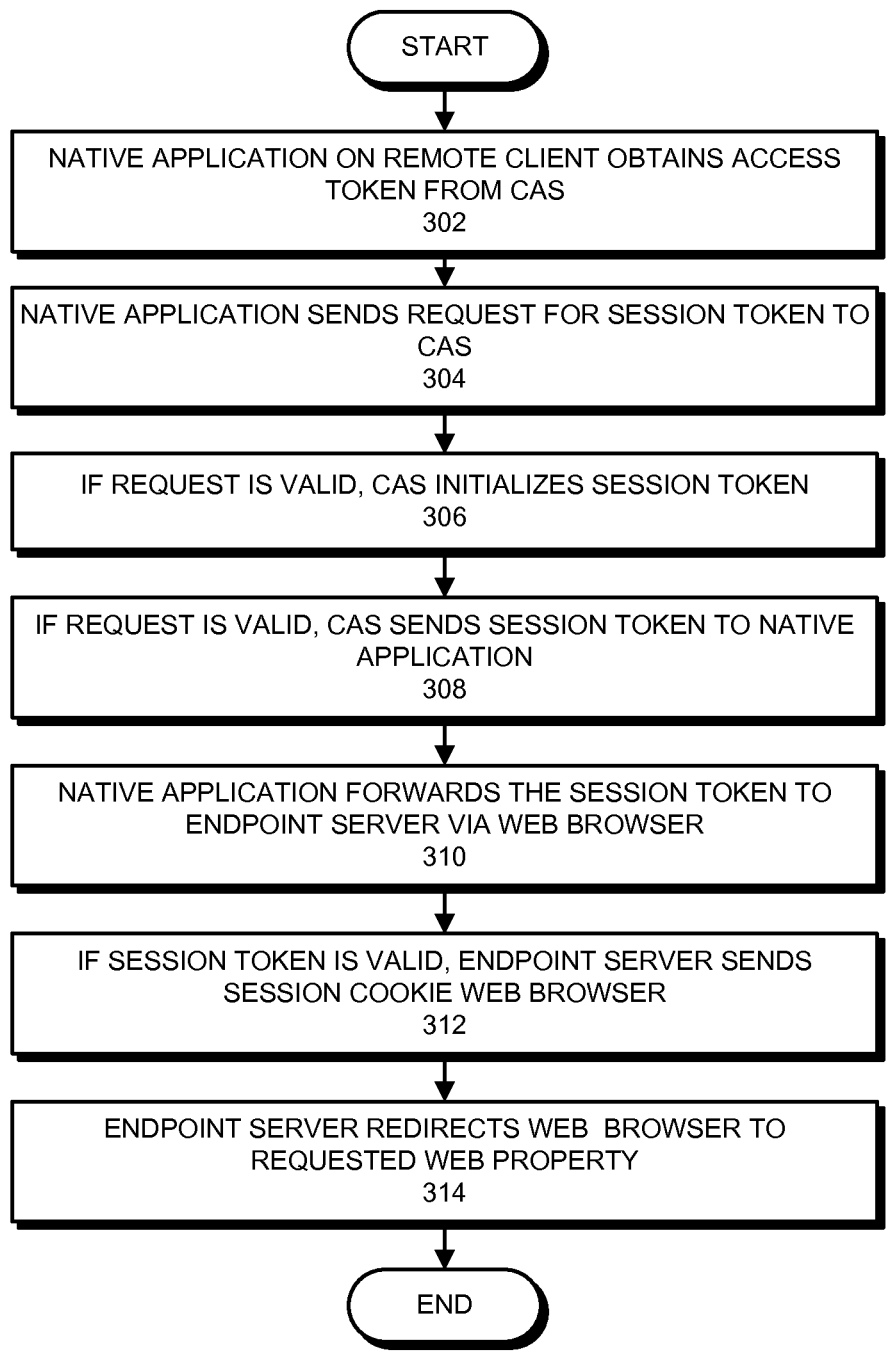
FIG. 3 presents a flow chart illustrating the process of securely transitioning a logged-in state from a native application to a web resource in accordance with an embodiment of the present invention.
Figure 4:
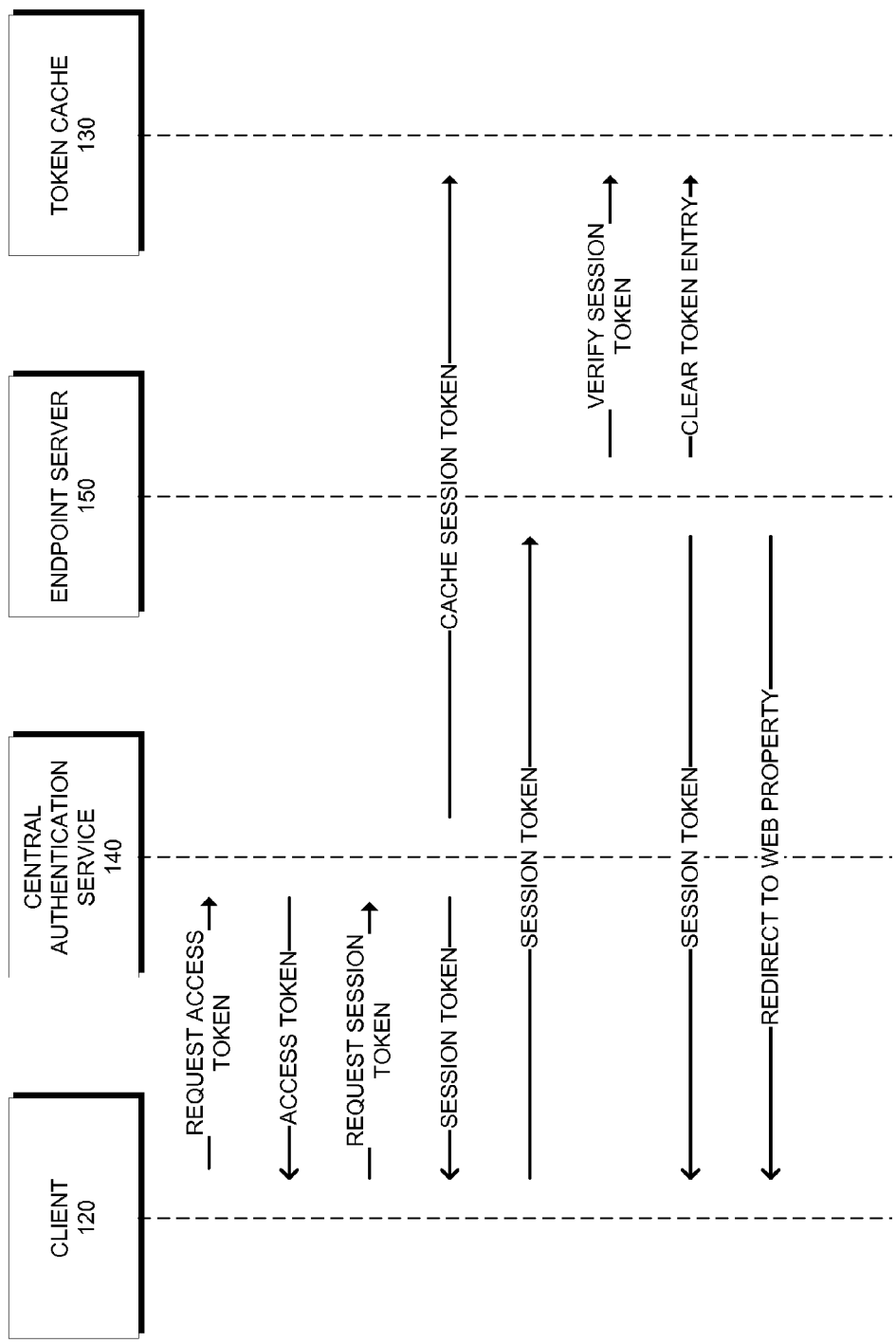
FIG. 4 presents a sequence diagram illustrating the flow of interactions among the client, the Central Authentication Service (CAS), the endpoint server, and the token cache.

FIG. 3 presents a flow chart illustrating the process of automatically transitioning a user's logged-in state within an application to a web resource that is external to the application. FIG. 4 presents a sequence diagram that illustrates the flow of interactions among the client, the Central Authentication Service (CAS), the endpoint server, and the token cache.

Initially, the native application obtains an access token from the CAS when the user executes the native application on the client device for the first time (operation 302). For example, suppose user 110 has just installed an accounting program onto client device 120, which could be a personal desktop computer in her home office. Suppose also that the accounting program (native application mechanism 204) is provided by a software development company that also provides a family of financial management programs similar to the accounting program and has users sign up for user accounts with the company, wherein the accounts are linked to all financial management programs and web properties provided by the company. Finally, suppose that user 110 has created one of these accounts. When user 110 then loads the accounting program on device 120, the program prompts user 110 to enter her account's username and password into a popup dialog box. User 110 then enters her username and password into the dialog box. Next, the program internally transmits these credentials, via a secured request for an access token, across cloud 170 to "https://software.com/central_authentication_service/", the company's CAS that runs on company servers. After verifying that the credentials are valid, the CAS generates an access token and returns the access token via a secured response to the program. Finally, the program securely stores the access token within an encrypted data file. In this example, user 110 will not need to re-enter her credentials into the program for six months, after which the access token will automatically expire.

When the user of the native application invokes a function that requires the native application to send the user to a web resource via an external browser, the native application sends a request for a session token to the CAS (operation 304). For example, suppose an add-on software package exists for the accounting program. Further, suppose that, aside from purchasing this package from the company's website, users of the accounting program could invoke a shortcut to purchasing the add-on by clicking on a small advertising button located in the top right corner of the program's GUI. By clicking on the button, the program launches an external system browser and directs that browser to the user's account page where the user could immediately purchase the add-on package. However, because the user's account page is a protected web resource, the browser would require the user to provide her username and password. While the program could pass the stored access token to the browser to bypass this inconvenience, passing a long-term unscoped credential such as an access token to a third-party program such as a web browser would be insecure. Instead, the program must obtain a session token to pass to the web browser. Thus, when user 110 clicks on the button, the program builds an HTTP request and appends to the request, as query parameters, the access token, an application token, and context parameters. The context parameters include a string constant "AppPurchase" which indicates that the user wants access to the web resource that allows her to purchase the add-on program. After signing the request with a secret, the program transmits the request from client 120 to CAS 140.

Next, if the request is valid, token initialization mechanism 224 initializes a session token (operation 306). For example, in order to check whether the request for a session token is valid, request validation mechanism 222 determines whether the access token is valid and whether the context parameters are sane. Request validation mechanism 222 checks the access token against a database of issued and unexpired access tokens to see whether there is a match. Request validation mechanism 222 then checks the application token against application whitelist 160 to ensure that the source of the request is a known application. Request validation mechanism 222 then determines whether the context parameter string constant "AppPurchase" is a valid string constant, and if so, whether the user linked to the access token has access to the web resource specified by "AppPurchase." If so, then the request is valid. Token initialization mechanism 224 then creates a session token by generating a random ID. Using the newly generated session token as a cache key, token initialization mechanism 224 then selects a bucket from token cache 130. Token initialization mechanism 224 then stores the session token, and context parameters into an entry in the bucket. If the bucket already holds an entry, the new entry is chained into the bucket. At this point, the session token will be valid for one minute before the CAS automatically expires the session and clears the corresponding token cache entry.

Next, the CAS responds to the native application's request with a response that includes the token (operation 308). For example, CAS 140 generates an XML statement, which contains in one of the XML elements, the response token. CAS 140 then sends an HTTP response that includes the XML to the program executing on device 120.

Next, the native application relays the session token to the endpoint server via an external web browser (operation 310). For example, after receiving the HTTP response from CAS 140, the program extracts the session token from the XML in the response. The program then retrieves the URL of endpoint server 150, the endpoint authentication server that provides access to the desired web resource, from an internal data file, which is: "https://accounting.software.com/Logon/". The program then appends the session token to this URL as a query parameter. The program then launches an Internet Explorer (web browser mechanism 206) and directs Internet Explorer to the URL. Internet Explorer follows the URL to endpoint server 150 and presents the session token, located in the query parameter, to endpoint server 150

Next, if the session token is valid, the endpoint server will grant session cookies to the web browser (operation 312). For example, after receiving the session token, token validation mechanism 262 uses the session token as a cache key to locate a bucket in token cache 130. If the bucket is empty, then the session token is invalid. Otherwise, token validation mechanism 262 determines whether one of the entries in the bucket contains a session token that matches the session token received from Internet Explorer. If so, the session token is valid. Token validation mechanism 262 then extracts all context parameters from the entry with the matching session token and attempts to determine which web resource Internet Explorer needs access to. In doing so, token validation mechanism 262 recognizes the string constant "AppPurchase" and retrieves the URL of the web resource, "https://accounting.software.com/Purchase_application/" that "AppPurchase" refers to, from an internal string-constant-to-URL mapping. Cookie generation mechanism 264 then generates HTTP session cookies that are scoped to the subdomain "accounting.software.com" and sets these cookies on Internet Explorer. Next, endpoint server 150 expires the session token by clearing the session token's corresponding entry from the token cache.

Finally, the endpoint server redirects the external web browser to the web resource (operation 314). For example, endpoint server 150 directs Internet Explorer to "https://accounting.software.com/Purchase_application". Note that the exchange between Internet Explorer and endpoint server 150 may be so quick that the first webpage user 110 notices is the web resource itself. Throughout the example given in this flow, user 110 has only had to provide her username and password to the accounting program once, while retaining the ability to access protected affiliated web properties that are provided by the software company.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for granting a user of a native application access to a web resource affiliated with the native application, the method comprising:
    receiving, at the native application that executes on a computer, a username and password from a user of the native application;
    using the username and password to make an access token request to a Central Authentication Service (CAS);
    receiving the access token from the CAS;
    using the access token to make a session token request to the CAS, wherein the session token request identifies the web resource and wherein the session token request identifies the native application, thereby enabling the CAS to use an application whitelist to determine that the native application is valid;
    receiving the session token from the CAS; and forwarding the session token to an endpoint server, thereby enabling the endpoint server to initialize an authenticated session that is scoped to the web resource, wherein doing so comprises:
    launching a web browser to pass the session token to an endpoint server, thereby enabling the endpoint server to send Hypertext Transfer Protocol (HTTP) session cookies to the web browser, wherein the HTTP session cookies are scoped to the web resource; and
accepting, at the web browser, the HTTP session cookies to obtain access to the web resource.

2. The computer-implemented method of claim 1, wherein the username and password are used to access one or more of the following:
    other native applications affiliated with the native application; and
    web properties that are affiliated with the native application.

3. The computer-implemented method of claim 1, wherein the session token request comprises one of:
    a Hypertext Transfer Protocol (HTTP) request; and
    the access token with one or more context parameters wherein the context parameters identify the web resource.

4. The computer-implemented method of claim 1, wherein:
    the access token automatically expires after a first time period, and
    the session token automatically expires after a second time period that is shorter than the first time period.

5. The computer-implemented method of claim 1, further comprising:
    receiving, at the web browser, a redirection from the endpoint server; and
    following, at the web browser, the redirection from the endpoint server.

6. The computer-implemented method of claim 1, further comprising:
    using the access token to make a second session token request to the CAS, wherein the session token request identifies a second web resource;
    receiving a second session token from the CAS; and
    forwarding the second session token to the endpoint server, thereby enabling the endpoint server to initialize a second authenticated session that is scoped to the second web resource.

7. The computer-implemented method of claim 1, further comprising, after the session token expires:
    using the access token to make a second session token request to the CAS, wherein the session token request identifies the web resource;
    receiving a second session token from the CAS; and
    forwarding the second session token to the endpoint server, thereby enabling the endpoint server to initialize a second authenticated session that is scoped to the web resource.

8. A computer-implemented method for granting a user of a native application access to a web resource that is affiliated with the native application, the method comprising:
    receiving, by computer, an access token request from the native application installed on a client, wherein the access token request comprises a username and password;
    sending an access token to the native application, thereby enabling the native application to use the access token to make a session token request;
    receiving the session token request from the native application, wherein the session token request identifies a web resource; and
    validating the session token request, wherein validating the session token request comprises using an application whitelist to determine that the native application is valid;
    initializing the session token; and
    sending the session token to the native application, thereby enabling the native application to launch a web browser to pass the session token to an endpoint server, thereby enabling the endpoint server to generate and send Hypertext Transfer Protocol (HTTP) session cookies, which are scoped to the web resource, to the web browser to grant the web browser access to the web resource.

9. The computer-implemented method of claim 8, wherein the session token request:
    is a Hypertext Transfer Protocol (HTTP) request; and comprises:
    the access token; and
    one or more context parameters wherein the context parameters identify the web resource.

10. The computer-implemented method of claim 8, wherein:
    the access token automatically expires after a first time period; and the session token automatically expires after a second time period that is shorter than the first time period.

11. The computer-implemented method of claim 8, wherein initializing the session token comprises:
    creating the session token by generating a random identifier;
    while using the session token as a key, selecting an entry in a token cache; and
    storing the session token and the context parameters in the entry.

12. The computer-implemented method of claim 11, wherein the endpoint server generates and sends HTTP session cookies to the web browser by:
    validating the session token;
    using the session token as a key to select an entry from the token cache;
    generating HTTP session cookies that are scoped to the web resource;
    sending the cookies to the web browser; and
    expiring the session token.

13. The computer-implemented method of claim 12, wherein the session token is valid if:
    the session token, when used as a key to the token cache, points to a valid entry in the token cache; and
    the session token matches the session token stored in the entry.

14. A non-transitory computer-readable storage medium storing instructions that when executed by a computer cause the computer to perform a method for granting a user of a native application access to a web resource affiliated with the native application, the method comprising:
    receiving, at the native application, a username and password from a user of the native application;
    using the username and password to make an access token request to a Central Authentication Service (CAS);
    receiving the access token from the CAS;
    using the access token to make a session token request to the CAS, wherein the session token request identifies the web resource and wherein the session token request identifies the native application, thereby enabling the CAS to use an application whitelist to determine that the native application is valid;

receiving the session token from the CAS; and forwarding the session token to an endpoint server, thereby enabling the endpoint server to initialize an authenticated session that is scoped to the web resource, wherein doing so comprises:

launching a web browser to pass the session token to an endpoint server, thereby enabling the endpoint server to send Hypertext Transfer Protocol (HTTP) session cookies to the web browser, wherein the HTTP session cookies are scoped to the web resource; and accepting, at the web browser, the HTTP session cookies to obtain access to the web resource.

15. The non-transitory computer-readable storage medium of claim 14, wherein the session token request comprises one of:

a Hypertext Transfer Protocol (HTTP) request; and the access token with one or more context parameters wherein the context parameters identify the web resource.

16. A non-transitory computer-readable storage medium storing instructions that when executed by a computer cause the computer to perform a method for granting a user of a native application access to a web resource that is affiliated with the native application, the method comprising:

receiving an access token request from the native application installed on a client, wherein the access token request comprises a username and password;

sending an access token to the native application, thereby enabling the native application to use the access token to make a session token request;

receiving the session token request from the native application, wherein the session token request identifies a web resource; and validating the session token request, wherein validating the session token request comprises using an application whitelist to determine that the native application is valid;

initializing the session token; and sending the session token to the native application, thereby enabling the native application to launch a web browser to pass the session token to an endpoint server, thereby enabling the endpoint server to generate and send Hypertext Transfer Protocol (HTTP) session cookies, which are scoped to the web resource, to the web browser to grant the web browser access to the web resource.

17. The non-transitory computer-readable storage medium of claim 16, wherein initializing the session token comprises:

creating the session token by generating a random identifier;

while using the session token as a key, selecting an entry in a token cache; and storing the session token and one or more context parameters included in the session token request in the entry.

18. The non-transitory computer-readable storage medium of claim 17, wherein the endpoint server generates and sends HTTP session cookies to the web browser by:

validating the session token;

using the session token as a key to select an entry from the token cache;

generating HTTP session cookies that are scoped to the web resource;

sending the cookies to the web browser; and expiring the session token.

19. A computer system, comprising:

a processor;

memory; and a program module, wherein the program module is stored in the memory and configured to be executed by the processor, the program module including instructions for granting a user of a native application access to a web resource affiliated with the native application, wherein the instructions include:

instructions for, receiving, at the native application, a username and password from a user of the native application;

instructions for, using the username and password to make an access token request to a Central Authentication Service (CAS);

instructions for, receiving the access token from the CAS;

instructions for, using the access token to make a session token request to the CAS, wherein the session token request identifies the web resource and wherein the session token request identifies the native application, thereby enabling the CAS to use an application whitelist to determine that the native application is valid;

instructions for, receiving the session token from the CAS; and instructions for, forwarding the session token to an endpoint server, thereby enabling the endpoint server to initialize an authenticated session that is scoped to the web resource, wherein doing so comprises:

launching a web browser to pass the session token to an endpoint server, thereby enabling the endpoint server to send Hypertext Transfer Protocol (HTTP) session cookies to the web browser, wherein the HTTP session cookies are scoped to the web resource; and accepting, at the web browser, the HTTP session cookies to obtain access to the web resource.

20. A computer system, comprising:

a processor;

memory; and a program module, wherein the program module is stored in the memory and configured to be executed by the processor, the program module including instructions for granting a user of a native application access to a web resource that is affiliated with the native application, wherein the instructions include:

instructions for, receiving an access token request from the native application installed on a client, wherein the access token request comprises a username and password;

instructions for, sending an access token to the native application, thereby enabling the native application to use the access token to make a session token request;

instructions for, receiving the session token request from the native application, wherein the session token request identifies a web resource;

validating the session token request, wherein validating the session token request comprises using an application whitelist to determine that the native application is valid;

initializing the session token; and sending the session token to the native application, thereby enabling the native application to launch a web browser to pass the session token to an endpoint server, thereby enabling the endpoint server to generate and send Hypertext Transfer Protocol (HTTP) session cookies, which are scoped to the web resource, to the web browser to grant the web browser access to the web resource.

21. The computer system of claim 20, wherein initializing the session token comprises:

creating the session token by generating a random identifier;

while using the session token as a key, selecting an entry in a token cache; and storing the session token and one or more context parameters included in the session token request in the entry.

* * * * *